United States Patent [19]
Lowther

[11] 3,875,035
[45] Apr. 1, 1975

[54] SOLID STATE FREQUENCY CONVERTER FOR CORONA GENERATOR

[75] Inventor: Frank E. Lowther, Phelps, N.Y.

[73] Assignee: Purification Sciences, Inc., Geneva, N.Y.

[22] Filed: July 3, 1973

[21] Appl. No.: 376,123

Related U.S. Application Data

[60] Division of Ser. No. 174,691, Aug. 25, 1971, Pat. No. 3,784,838, which is a continuation-in-part of Ser. No. 141,148, May 7, 1971, abandoned, which is a continuation-in-part of Ser. No. 830,248, June 4, 1969, Pat. No. 3,798,457, which is a continuation-in-part of Ser. No. 709,485, Feb. 29, 1968, abandoned, which is a continuation-in-part of Ser. No. 612,751, Jan. 4, 1967, abandoned.

[52] U.S. Cl. .................................. 204/176, 321/4
[51] Int. Cl. .................. C01b 13/10, H02m 5/40
[58] Field of Search ........................... 204/176; 250/531-2, 535-6

[56] References Cited
UNITED STATES PATENTS

| | | | |
|---|---|---|---|
| 2,822,327 | 2/1958 | Hammesfahr | 204/176 |
| 3,205,162 | 9/1965 | MacLean | 250/531 |
| 3,455,803 | 7/1969 | Miller | 204/176 |
| 3,496,092 | 2/1970 | Fraser | 250/531 |
| 3,736,492 | 5/1973 | Rosenthal et al. | 321/45 R |
| 3,784,838 | 1/1974 | Lowther | 250/536 |
| 3,800,210 | 3/1974 | Caussin | 321/9 R |

*Primary Examiner*—John H. Mack
*Assistant Examiner*—Aaron Weisstuch
*Attorney, Agent, or Firm*—Schovee & Boston

[57] ABSTRACT

A method and apparatus for converting low frequency current to high frequency current and for applying the high frequency current to the electrodes of a corona generator. The frequency converter includes a rectifier circuit, and a chopping circuit. The chopping circuit includes an SCR and a firing circuit connected to the SCR. The chopping circuit does not require a conventional shut-off circuit. The SCR is connected to an ozone generator through a transformer and automatically shuts off.

3 Claims, 13 Drawing Figures

SOLID STATE FREQUENCY CONVERTER FOR CORONA GENERATOR

CROSS-REFERENCES TO RELATED APPLICATIONS

This application is a divisional of my copending application Ser. No. 174,691, filed Aug. 25, 1971 and now U.S. Pat. No. 3,784,838, which was in turn a C.I.P. of my copending application Ser. No. 141,148, filed May 7, 1971 and now abandoned, which was a C.I.P. of Ser. No. 830,248, filed June 4, 1969 and now U.S. Pat. No. 3,798,457 and of Ser. No. 709,485, filed Feb. 29, 1968, now abandoned, which was a C.I.P. of Ser. No. 612,751, filed Jan. 4, 1967 and now abandoned.

BACKGROUND OF THE INVENTION

1. Field of the Invention

This invention relates to corona generators and more particularly to a frequency converter for an ozone generator.

2. Description of the Prior Art

It is known that the ozone output from a corona generator is proportional to the frequency of the current applied across the electrodes. However, the heat generation is also proportional to the frequency, and since all commercial ozone generators (prior to those disclosed in my copending application Ser. No. 141,148) are already heat limited, the ozone output or yield of the known commercial generators can not be increased by increasing the frequency. However, the present invention can be of significant use even in known commercial ozone generators because by increasing the frequency of the applied current, the same ozone output can be achieved while decreasing the voltage. This factor is important because the rate of ozone generating cell failures or break-downs is proportional to the applied voltage; thus, by reducing the voltage, the failure rate is reduced and the replacement cycle is advantageously extended. Further, lower voltage transformers are less expensive than high voltage transformers. Further, any effort to increase frequency, even if such could be useful, would be in the direction of using a motor generator rather than in using a solid state frequency converter, because the costs of standard solid state frequency converters are about five to ten times the cost of a motor generator, as contrasted with the relatively low cost of the solid state frequency converter of the present invention. However, if a solid state frequency converter were to be used, it would employ conventional circuits for both firing the SCR and for shutting the SCR off. The present invention completely unexpectedly does not require a conventional shut-off circuit for the SCR.

SUMMARY OF THE INVENTION

The present invention comprises a solid state frequency converter for a corona generator including an SCR for chopping rectified current. The frequency converter includes a firing circuit for the SCR but does not employ a conventional shut-off circuit. The SCR is connected to a corona generator through a transformer (preferably a step-up transformer), and is shut off automatically. The exact nature of why the shut-off feature works the way it does is not completely understood, however, it apparently is due to certain electrical peculiarities in the operation of the ozone generator, as fed back to the SCR through the transformer.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DETAILED DESCRIPTION OF THE PREFERRED EMBODIMENTS

Figure 1:
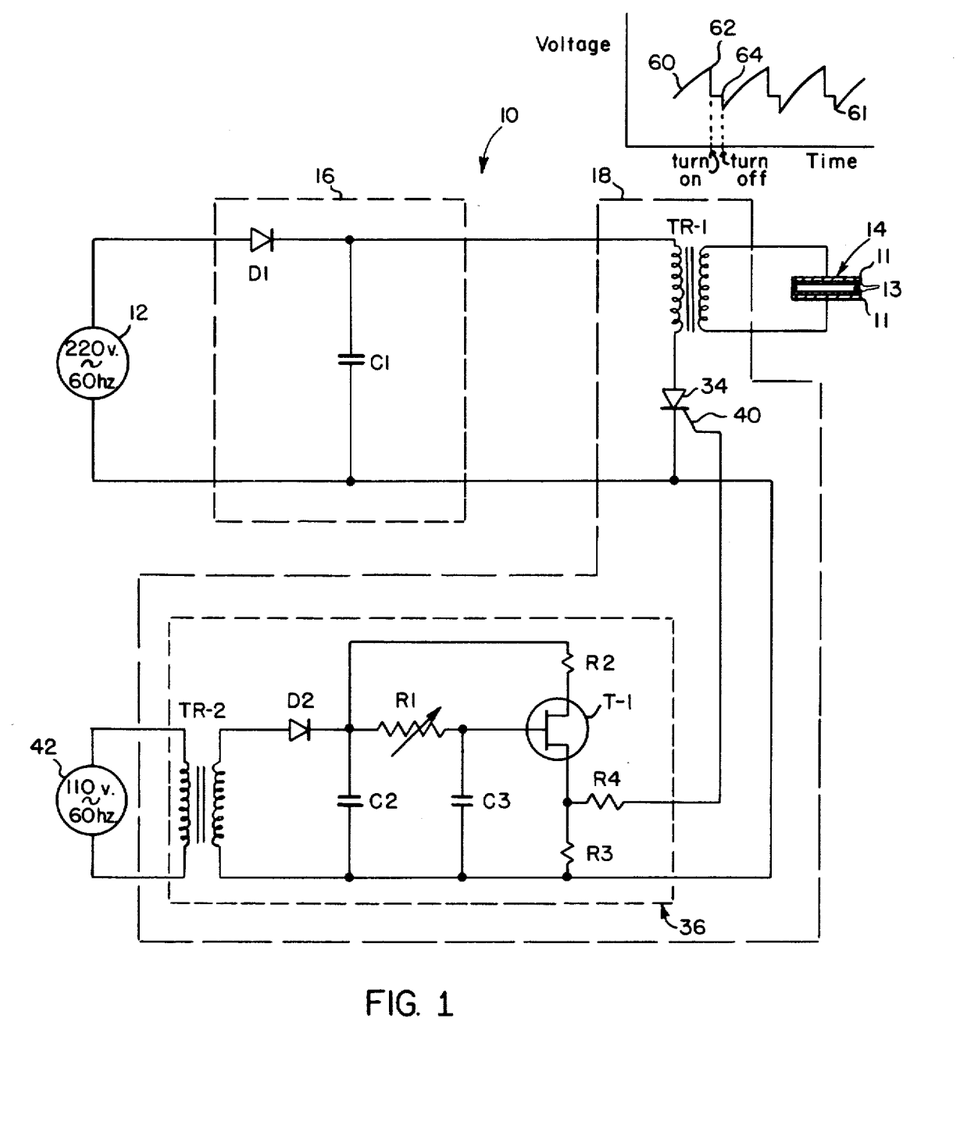
FIG. 1 is a partly schematic, partly diagrammatic, showing of the frequency converter of the present invention.

The preferred frequency converter of the present invention will now be described with reference to a specific unit for operating with a 220 V. AC, 60 Hz, source, for energizing a 6-cell, 20 lb./day ozone generator. Referring now in detail to the drawings, FIG. 1 shows the preferred frequency converter circuit 10 of the present invention for increasing the frequency (and in this preferred embodiment, for also increasing the voltage) of current supplied from a 220 volt, 60 Hz power supply 12 and from a 110 volt, 60 Hz supply 42, to a corona generator 14.

The corona generator 14 (diagrammatically shown here as a pair of spaced electrodes 11, each with a dielectric coating 13) is preferably a six cell ozone generator of the type described below with respect to FIGS. 2–13.

The circuit 10 includes a rectifier circuit 16, and a chopping circuit 18. The rectifier circuit 16 includes a rectifier D1 and a capacitor C1. D1 is an RCA rectifier IN1190A and C1 is a standard electrolytic capacitor, 1,000 uf at 350 v. DC, such as Mallory CAS 302T350FJ1. The operation of the rectifier circuit 16 is well known to those skilled in the art and need not be described in detail here.

After the current from the source 12 has been rectified by the rectifier circuit 16, it is chopped by the chopping circuit 18. The chopping circuit 18 comprises an SCR 34, a firing circuit 36, and a transformer TR-1 connecting the SCR 34 to the corona generator 14.

The firing circuit 36 is a known, low power, firing circuit operating in known fashion to produce a series of voltage pulses to fire the SCR 34 (in this embodiment the voltage pulses are approximately 10 volt). The firing circuit 36 is connected between the gate 40 of the SCR 34 and the 110 volt, 60 Hz power supply 42. The firing circuit 36 includes a unijunction transistor T-1 connected to the power supply 42 through a transformer TR-2. The firing circuit includes a diode D2, capacitors C2 and C3, variable resistor R1, and resistors R2, R3, and R4. At start up, the variable resistor R1 (the "throttle") is usually at about 50,000 ohm, causing a low frequency current to be applied to the corona generator 14. The system is then slowly brought up to power, with the resistance of resistor R1 at about 11,500 ohm, which produces a frequency of about 2000 Hz. The transformer TR-1 has about a 15-1 turns ratio to provide a voltage to the corona generator 14 of about 3500 volt rms. The operation of this firing circuit 36 is well known and need not be described in detail here.

The specific components used in the preferred circuit described above are as follows:

| | |
|---|---|
| D2 | Any standard low power diode such as GE-IN537 or International Rectifier IN3640 |
| C2 | Standard 100 uf at 50 volt DC capacitor such as Mallory MTV 100D U50 |
| C3 | Standard .047 uf at 100 volt such as Mallory PVC1147 |
| T1 | Unijunction transistor — GE 2N2646 |
| TR2 | Any standard 25 volt Filament transformer, such as Allied 6-K-37HF |
| TR1 | Special 4KV6 3500 volt 2000 Hz transformer made by NWL Inc. Trenton, New Jersey |
| SCR-1 | Silicon controlled rectifier, International Rectifier 40RCS70 |
| All resistors standard, 5%, ½ watt units. | |
| R1 | Variable resistor, such as IRC Model HD-150, 50,000 ohm |
| R2 | 150 ohm |
| R3 | 4700 ohm |
| R4 | 100 ohm |

Completely unexpectedly, the SCR 34, connected to a corona generator 14 through the transformer TR-1, is automatically shut off, without requiring the use of a standard shut-off circuit connected to the SCR 34. This discovery is the essence of the present invention. While the mechanism which causes this shut-off to occur is not completely understood, it is believed to be caused by the non-linear variations in capacitance in the ozone generator, fed back to the SCR 34 through the transformer 20. In this specific embodiment, the SCR is shut off about one-fourth cycle after firing of the SCR.

Another very important aspect of this invention is the fact that an ozone generator does not require a smooth sine wave from the frequency converter; this fact is important because by eliminating the electrical circuitry and components required to produce a smooth sine wave, the cost of a solid state frequency converter can be reduced substantially. As described in detail in Applicant's copending application Ser. No. 141,148, filed May 7, 1971, the ozone output is proportional to the product of $V^2$ and $f$, where V is the peak voltage and $f$ is the frequency. Thus, the shape of the wave form is not important; all that is important is the peak voltage and the frequency. Referring to FIG. 1, the irregular wave form 60 produced by the frequency converter of the present invention is completely satisfactory and is quite remote from being a smooth sine wave. The term "irregular" is hereby defined for use in the present specification and claims as being other than a sine wave, square wave, triangular wave, etc., all of which "regular" wave forms require special circuitry for producing and maintaining. It is an important aspect of this invention that the only circuitry required is that to produce the desired frequency and voltage; the particular "irregular" wave form that is produced by this limited amount of circuitry is perfectly useful as is; it does not have to be converted into any special "regular" shape, nor does it have to be maintained exactly in such "regular" shape. The point 62 of the wave form 60 marks the point where the SCR 34, is fired, and the point 64 is where shut-off of the SCR occurs.

The present invention is not limited to the presently preferred specific embodiment described above; various alternatives can be used. For example, although a transformer at the location of transformer TR-1 is essential it need not be a step-up transformer; it can be a 1-1 transformer. Further, While it is necessary to have a fluid reactant in the corona chamber, it need not be air or oxygen, and the corona generator need not be an ozone generator. Further, rather than chopping the current and then increasing its voltage with the transformer TR-1, the voltage can be increased first and then rectified (requiring a high voltage solid state rectifier) and chopped. However, it would still be necessary to employ a transformer connection (even if just a 1—1 transformer) to the ozone generator to achieve automatic shut-off. If sufficiently high voltage SCRs are not available, they can be connected in series, or a thyratron can be used. Other standard firing circuits can be used. Other corona generators can be used than that described herein.

The preferred embodiment of the present invention employs, for the corona generator 14 of FIG. 1, the ozone generator 110 described in my copending application Ser. No. 141,148, filed May 7, 1971; the entire specification, claims, and drawings of said application Ser. No. 141,148 are hereby incorporated herein by reference. The description of the ozone generator is set forth below for completeness, with reference to FIGS. 2–13 herein.

THE CORONA REACTOR 110

Figure 2:
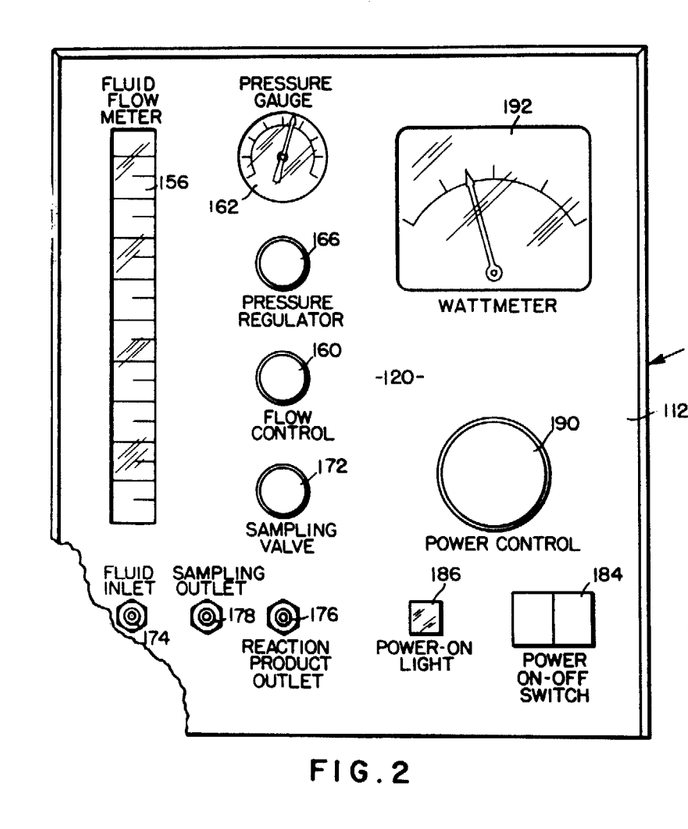
FIG. 2 is a front elevation of the corona reactor 10 showing the control panel 20 thereof.
Figure 3:
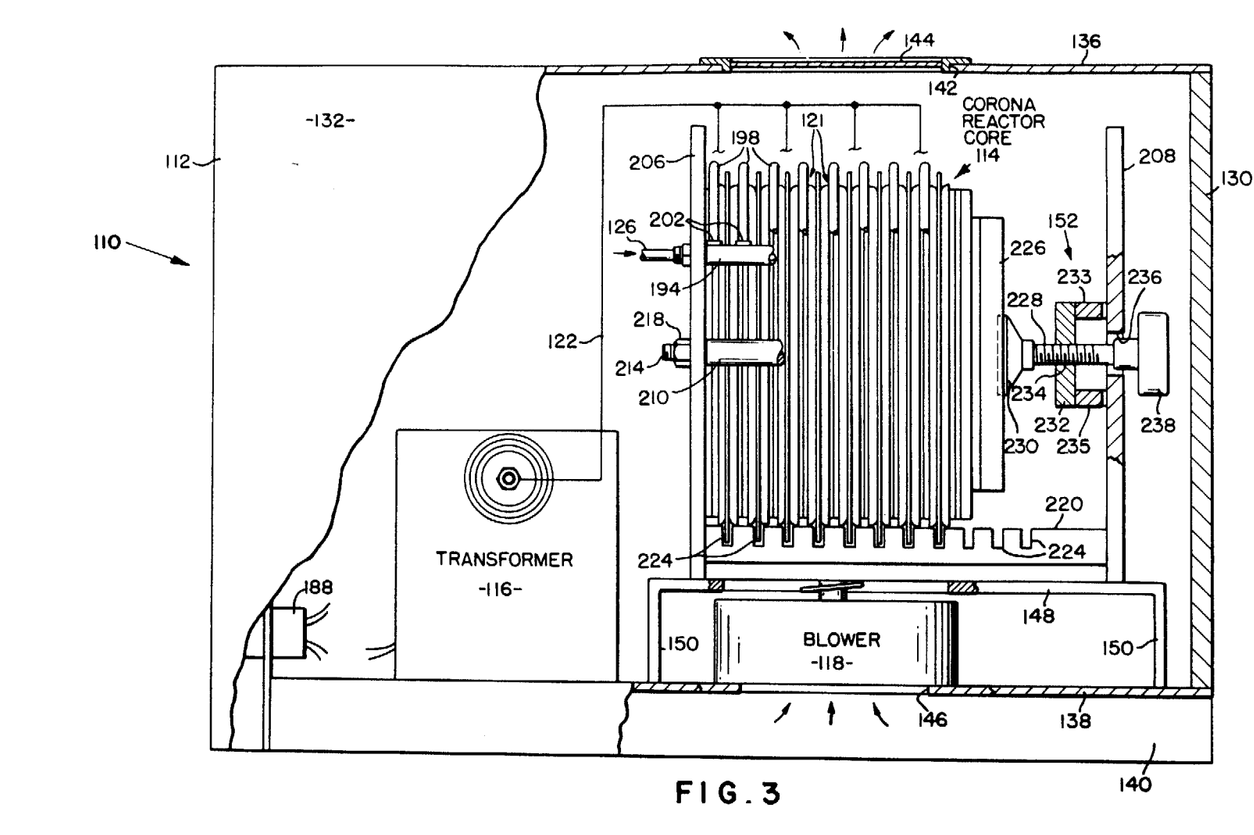
FIG. 3 is a partly broken-away side view of the corona reactor 10 of FIG. 2.
Figure 4:
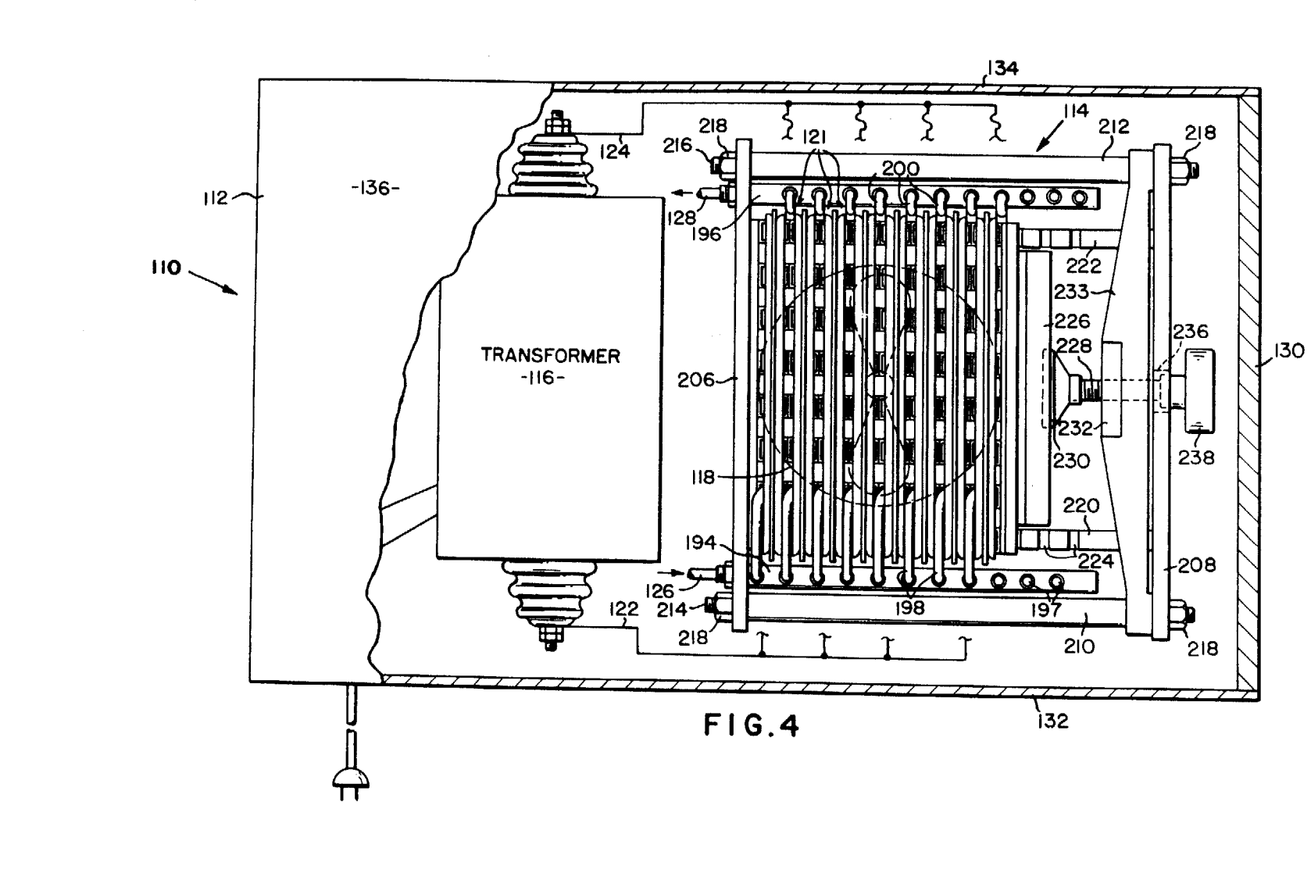
FIG. 4 is a partly broken-away plan view of the corona reactor 10 of FIG. 2.

Referring to FIGS. 2–7 for a description of the overall arrangement of parts of the present invention, FIGS. 2–4 show a corona reactor 110 of the present invention comprising: a housing 112 containing a corona reactor core 114, a transformer 116 (the transformer TR-1 described above), a blower 118, and having a front control panel 120. The corona reactor core 114 is made up of a plurality of individual, separately removable, airtight corona reactor cells 121.

The heart of the corona reactor 110 is in the corona reactor core 114 and corona reactor cells 121, described in detail below under the heading "The Corona Reactor Core" and "The Corona Reactor Cell" respectively. For the present, it will be sufficient to state that:
1. electric power is supplied to the corona reactor core 114 from the transformer 116 by electrical lead lines 122 and 124;
2. a fluid reactant (when used as an ozone generator, it would be air, oxygen, or an oxygen-containing fluid) is supplied to the corona reactor core 114 from a source through inlet conduit 126;
3. a fluid reaction product is removed from the corona reactor core 114 by an outlet conduit 128; and
4. the corona reactor core 114 is air-cooled by the blower 118.

The Housing 112

The housing 112 comprises the front control panel 120, a rear wall 130, a pair of sidewalls 132 and 134, a cover 136, and a floor 138 spaced above the surface upon which the corona reactor 110 is supported by legs 140. The cover 136 is made easily removable, by means of screws (not shown) or other known type of connecting means, to provide a convenient means of access to the interior of the housing 112, especially for the addition and/or removal of individual corona reactor cells 121 to the core 114. The cover includes an air exhaust opening 142, above the corona reactor core 114, covered by a wire screen 144. The floor 138 includes an air inlet opening 146 below the blower 118.

The housing includes a sub-floor 148 spaced by means of legs 150 a sufficient distance above the floor 138 to accomodate the blower 118. The sub-floor 148 supports the corona reactor core 114 including a clamp device 152 (of a quick connect-disconnect type to be described below) for securing the individual corona reactor cells 121 together in a modular arrangement.

The Control Panel 120

Figure 5:
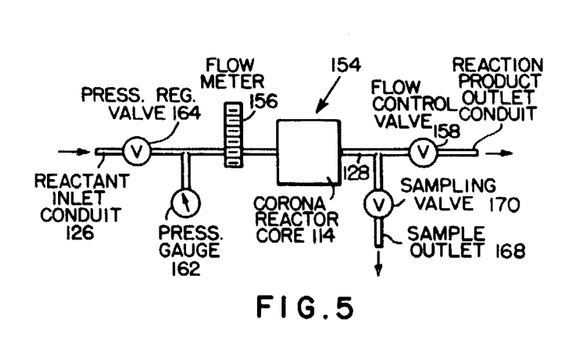
FIG. 5 is a schematic flow diagram for the fluid 10 reactant flow.
Figure 6:
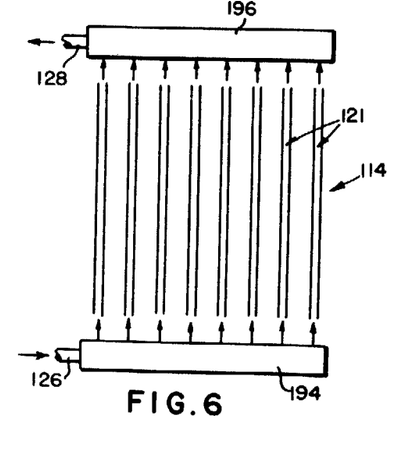
FIG. 6 is a simplified, schematic flow diagram showing the reactant flow into, through, and the reaction product flow out of, the corona reactor core 14 of the present invention.
Figure 7:
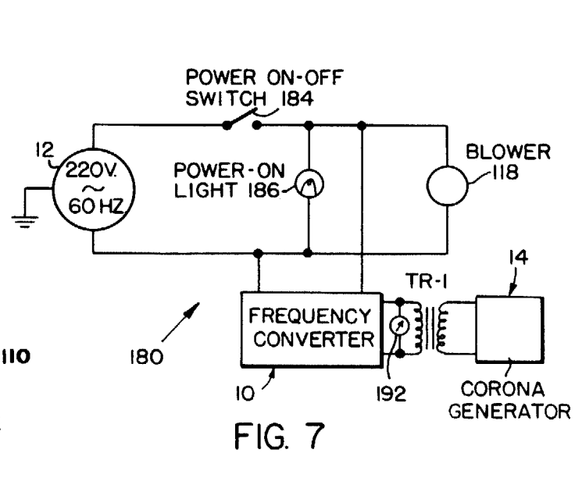
FIG. 7 is an electrical schematic circuit diagram of the power supply of the present invention.

Referring now to FIGS. 2, 5, and 7, a fluid conduit and control system 154 (FIG. 5) includes the inlet and outlet conduits 126 and 128 connected to the individual corona reactor cells 121 of the corona reactor core 114. The flow rate into, through and out of the corona reactor core 114 (see FIGS. 5 and 6) including the conduits 126 and 128, is indicated by a fluid-flow meter 156 on the control panel 120, and is controlled by a flow control valve 158 (FIG. 5) in outlet conduit 128, having a corresponding control knob 160 (FIG. 5) connected thereto and positioned on the control panel 120 and labeled "Flow Control." The fluid-flow meter 156 can be of any standard type, such as those using a vertically movable ball indicating cubic feet per minute of fluid flow.

The pressure of the fluid in the system 154 is indicated by a pressure gauge 162 on the control panel 120 and can be controlled by a pressure regulator valve 164 (FIG. 5) in inlet conduit 126 and having a corresponding pressure control knob 166 (FIG. 2) connected thereto and positioned on the control panel 120 and labeled "Pressure Regulator."

A convenient feature of the present invention is the provision of a sampling fluid outlet conduit 168 (FIG. 5) connected to outlet conduit 128. A sampling valve 170 (FIG. 5) is connected in sampling outlet conduit 168 and is connected to a corresponding sampling valve control knob 172 (FIG. 2) on the control panel 120 labeled "Sampling Valve."

With reference to FIG. 2, fluid connection can be made to the above-described three fluid conduits 126, 128 and 166 of the fluid conduit system 154 directly on the front panel 120 as follows. An inlet connector 174 positioned on the lower left-hand portion of control panel 120, is connected to the end of inlet conduit 126; an outlet connector 176 on control panel 120 is connected to the end of outlet conduit 128; and a sampling connector 178 is connected to the end of the sampling conduit 168.

Referring now to FIGS. 2 and 7, the electrical power supply circuit 180 of the present invention is the solid state frequency converter 10 described above with reference to FIG. 1. A power ON-OFF switch 184 is connected in the circuit 180 and is positioned on the control panel 120. A power-on light 186 is connected in the circuit 180 and is positioned on the control panel 120 adjacent the switch 184. The light 186 is energized when switch 184 is closed and indicates visually when the power is on. As shown in FIG. 7, the closing of switch 184 also energizes the blower 118.

The power applied to the corona generator 14 can by controlled by the variable resistor R1 connected to a power control knob 190 located on the control panel 120 and labeled "Power Control." The amount of power supplied to the corona generator 14 is indicated by a watt meter 192 located on the control panel 120.

THE CORONA REACTOR CORE 114

Referring to FIGS. 3 and 4, the corona reactor core 114 comprises a plurality of individual corona reactor cells 121 held together in the clamp 152. The individual corona reactor cells 121 will be described in detail below with reference to FIGS. 8–10.

The corona reactor core 114 is electrically connected to transformer 116 by means of the pair of electrical lead lines 122 and 124. The various modes of electrically connecting the individual corona reactor cells 121 will be discussed in detail below under the heading "THE ELECTRICAL CIRCUITS."

The fluid connections to the corona reactor core 114 are as follows. The inlet conduit 126 is connected to an inlet manifold 194 (FIGS. 3 and 4) on one side of the corona reactor core 114. The outlet conduit 128 is connected to an outlet manifold 196 (FIG. 4) located on the opposite side of the corona reactor core 114. As will be described in more detail below, each of the corona reactor cells 121 have an inlet tube 198 connected to the inlet manifold 194 and an outlet tube 200 connected to the outlet manifold 196. The tubes 198 and 200 are connected to the manifolds 194 and 196 by means of connectors 202 (FIGS. 3 and 8), of any known, suitable type. The connectors 202 are preferably of a quick connect-disconnect type. Since the number of cells 121 in any core 114 can vary, the inlet and outlet manifolds 194 and 196 respectively may have openings 204 (see FIG. 8) that are not being used; in such case, plugs 197 (FIG. 4) are connected to openings 204 to close them.

Referring to FIGS. 3 and 4, the clamp 152 includes a pair of stationary, vertical end plates 206 and 208 supported on the sub-floor 148 and held a predetermined distance apart by a pair of spacer tubes 210 and 212 and a pair of bolts 214 and 216, respectively, passing through the spacer tubes 210 and 212 respectively; the bolts are secured by means of nuts 218. A pair of horizontal support bars 220 and 222 are connected between the vertical end plates 206 and 208. The corona reactor core 114 sits directly on top of the horizontal support bars 220 and 222 (a spacer gasket 262, of each of the individual cells 121 extends into vertical slots 224 (FIG. 3) in each of the horizontal support bars 220 and 222 respectively).

The individual corona reactor cells 121 are vertically oriented and are horizontally stacked or pressed together by means of clamp 152 and are easily and separately removable from the corona reactor 110 by simply removing the cover 136 of the housing 112 and releasing the clamp 152. The individual corona reactor cells 121 are supported on the horizontal support bars 220 and 222 between the end plate 206 and a horizontally movable, vertical pressure plate 226. Pressure plate 226 is movable toward and away from the corona reactor core 114 by means of an externally screw-threaded shaft 228 (rotatably connected at a joint 230 to the pressure plate 226 and connected in screw-threaded relationship to end plate 208). A plate 232 connected, by a pair of supports 233 and 235, to end plate 208, is provided with a central, internally screw-threaded opening 234 in which the shaft 228 is matingly threaded for rotation. The end plate 208 is provided with an opening 236 to accomodate a knob 238 rigidly connected to the shaft 228. The knob 238 is rotated to apply or release pressure on the corona reactor core 114 through the pressure plate 226. The knob 238 is manually accessible when the cover 136 is off.

THE INDIVIDUAL CORONA REACTOR CELLS 121

Figures 8, 9, 10:
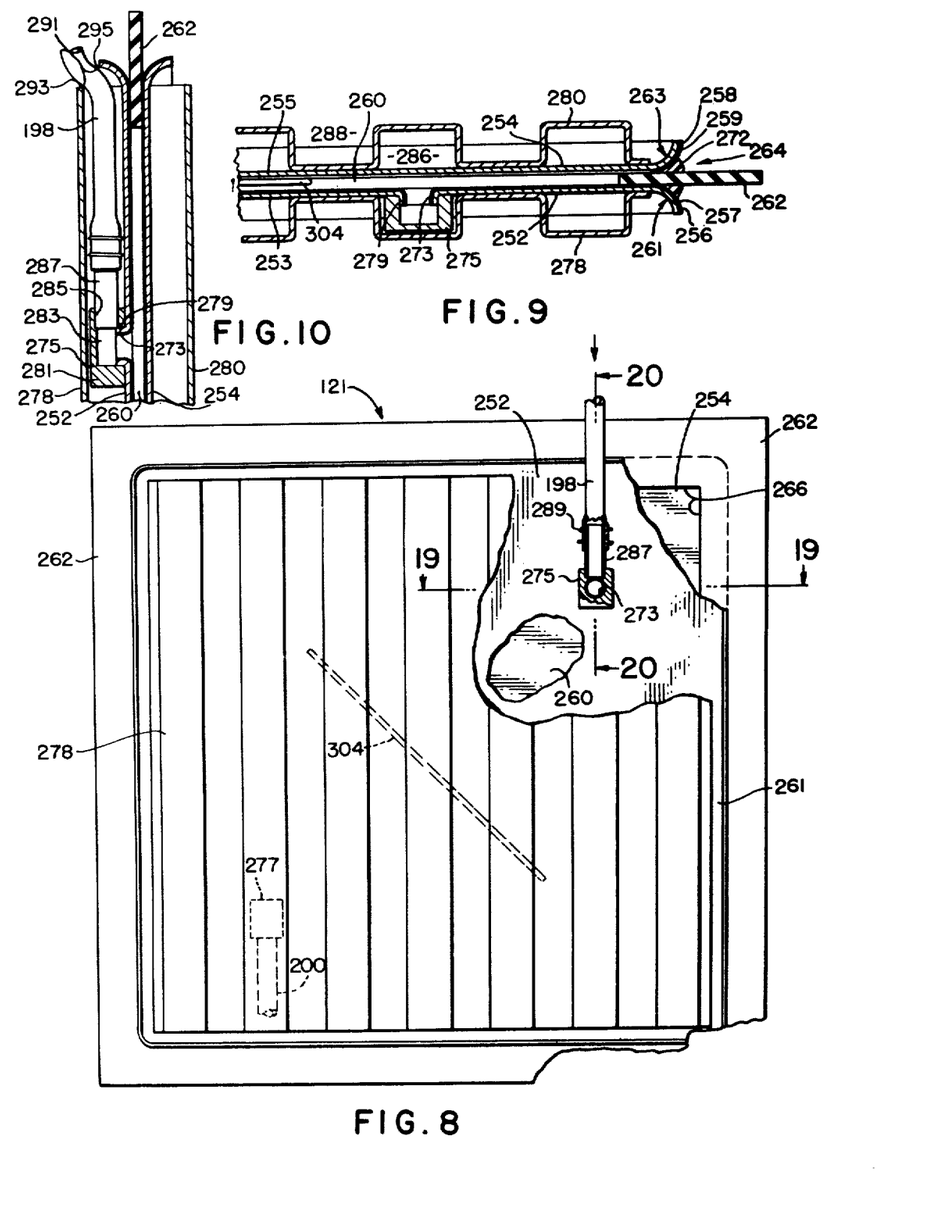
FIG. 8 is a front, plan view partly broken-away, of one embodiment of a corona reactor cell of the present invention.
FIG. 9 is an enlarged, partial, horizontal, cross-sectional view through the corona reactor cell of FIG. 8 taken along the line 19—19 of FIG. 8.
FIG. 10 is a vertical, partial, cross-sectional view through the corona reactor cell of FIG. 8, taken along the line 20—20 of FIG. 8.

FIGS. 8-10 illustrate a corona reactor cell 121 comprising a pair of parallel, uniformly spaced-apart electrodes 252 and 254, each having a bare exterior surface 253 and 255, respectively, exposed to ambient. The electrodes have a dielectric coating 256 and 258, respectively, on the interior surfaces 257 and 259 respectively, of the plates 252 and 254. The spaced-apart electrodes 252 and 254 define a corona reaction chamber 260 therebetween. The electrodes 252 and 254 are preferably decarbonized steel and the dielectric coating is a high softening temperature dielectric, preferably a thin layer of porcelain dielectric that is free of voids.

Reference is hereby made to other sections of the present specification for a description of the method and formulas to be used to determine the preferred type and thickness of the dielectric coatings 256 and 258, the width (inter-electrode or gap spacing) of the corona reaction chamber 260, and the applied voltage in the present invention.

The electrodes 252 and 254 are preferably rectangular and have a turned or flared edge 261 and 263, respectively (see FIGS. 8 and 9) around the entire periphery of the electrodes 252 and 254. The turned edges 261 and 263 are curved away from each other (i.e., away from the adjacent edge of the other of the two electrodes), which permits operation of the corona reactor cell 121 at high voltage without edge sparking. This structure results in the periphery of each of the composite corona reactor cells 121 having a groove 264 (FIG. 9) around the entire periphery thereof, which groove 264 provides for the achievement of a good seal or weld 272 around a spacer gasket 262 (to be described in more detail below).

The two electrodes 252 and 254 are maintained a predetermined distance apart by means of an insulating spacer gasket 262 having a central opening 266 (see FIG. 8), and positioned between the electrodes 252 and 254 around the entire peripheral edge of the cell 121. THe spacer gasket 262 is preferably made of plate glass with a 10 mil thick silicone rubber gasket on both sides of the spacer gasket 262. The spacer gasket 262 can be made of solid silicone rubber or any other suitable material (not metal).

The corona reaction chamber 260 is maintained airtight by sealing the electrodes 252 and 254 air-tight to the spacer gasket 262 by means of, for example, a "weld" or bead 272 of silicone sealant (such as that known as RTV) as shown in FIG. 9. The "weld" or bead is formed on both sides of the spacer gasket 262 around the entire periphery of the cell 121. The spacer gasket 262 thus performs the functions of defining the predetermined spacing between the electrodes 252 and 254 and rendering the cell 121 air-tight.

The fluid reactant is introduced into and removed from the corona reaction chamber 260 of the cell 121 as follows. As stated above, each cell 121 is provided with an inlet conduit 198 and an outlet conduit 200. The inlet conduit 198 is connected to an inlet port 273 in electrode 252 by means of a connector 275. The outlet conduit 200 is connected to an outlet port (not shown) in the other electrode 254 by means of a connector 277. Since the connectors 275 and 277 are identical, a description of one is sufficient. The connector 275 is welded or otherwise connected to the exterior surface 255 of electrode 252 at the port 273, which port 273 can include peripheral wall 279 extending in a direction away from the chamber 260. The connector 275 includes a metallic body 281 having a first cylindrical passageway 283 extending partway therethrough and accomodating or receiving the peripheral wall 279 (see FIG. 10). The body 281 of the connector 275 includes a second cylindrical passageway 285 perpendicular to the first passageway 283 and in fluid communication with the first passageway 283. A tube 287, preferably of metal is welded or otherwise connected to the body 281 at passageway 285 and extends beyond the body 281 to provide a convenient means of attaching the inlet conduit 198 to the connector 275. The conduit 198 can be slipped over the tube 287 and secured by means of a length of wire 289 twisted onto the conduit 198. The outlet conduit 200 is preferably constructed in the same manner. Both ports 273 (and not shown) can be in the same elelctrode if desired.

From the above description, it will be seen that each individual corona reactor cell 121 is its own individual pressure vessel, sealed by the spacer gasket 262 and the silicone seal or weld 272 "puttied" around the entire periphery of the cell 121 on both sides of the spacer gasket 262. Silicone rubber spacer gaskets and silicone sealant are preferably used because a corona or ozone will not degrade the silicone rubber and sealant, and the silicone rubber and sealant will not degrade the ozone.

In addition to the above described basic structure of the individual corona reactor cells 121, such cells 121 preferably include certain additional structure as follows. FIGS. 8-10 show a pair of aluminum heat sink spacers 278 and 280 in contact with the exterior surfaces 255 and 257, respectively, of the electrodes 252 and 254. The heat sink spacer 278 (a description of one is sufficient because they are identical) is formed with a corrugated design having a plurality of oppositely opening, parallel channels including closed channels 286 and open channels 288. The heat sing spacers 278 and 280 have several functions. One function of the heat sink spacers 278 and 280 is to act as a heat sink, to remove the heat generated by the corona reactor cell 121 during the corona reaction period. To aid in this function, it is preferred to blow cool air through the corona reactor core 114 in a direction parallel to the channels 286 and 288. This is accomplished by means of blower 118 (see FIG. 3). Thus, as shown in FIG. 4 the corona reactor cells 121 are arranged such that the channels 286 and 288 are oriented vertically so that air entering the corona reactor 110 from the bottom can be blown vertically up through the corona reactor core 114 and out the opening 142 in the housing 112. Another function of the spacers 278 and 280 is to maintain the adjacent corona reactor cells 121 in spaced-apart relationship, when a plurality of such cells 121 are combined to form a corona reactor core 114, and to carry and uniformly distribute the forces resulting from the pressure of the fluid reactant in the reaction chamber 260. The heat sink spacers 278 and 280 also carry and uniformly distribute the forces of the pressure plate 226 throughout the corona reactor core 114.

Being electrically as well as thermally conductive, the spacers 278 and 280 also provide the additional function of providing an electrical connection between adjacent electrodes of adjacent corona reactor cells 121. The spacers 278 and 280 thus provide convenient electrical terminals to which the electrical power can be applied and for electrically connecting the cells 121 together.

In order to form a corona reactor core 114 containing a plurality of corona reactor cells 121, the cells 121 are placed or stacked one against the other as shown in FIGS. 3 and 4, and the electrical and fluid connections made. Regarding FIG. 3 showing the horizontal support bars 220 and 222 having slots 224 therein, the reason for such slots 224 is now clearly seen, i.e., to provide access room for the spacer gaskets 262.

The conduit 198 carrying the fluid reactant into the reaction chamber 260 extends partway through one of the closed channels 286 of the spacer 278 and extends through the space 291 between one edge 293 (FIG. 10) of the spacer 278 and the adjacent edge 295 of the electrode 252. The outlet conduit 200 extends through one of the channels 286 in a similar manner to that just described for the inlet conduit 198.

FIGS. 8–10 show an additional feature of the present invention comprising a silicone baffle 304 to aid in the reaction by preventing the creation of any "dead spaces" in the reaction chamber 260. The baffle 304 is not a complete, imperforate wall extending across the entire width (inter-electrode gap) of the reaction chamber 260, but rather as shown in FIG. 9, merely extends partway across the width of the reaction chamber 260.

Further, to prevent arcing the voltage can be decreased. The same (or even greater) corona intensity can be maintained with a smaller voltage by increasing the frequency, as will be understood by reference to the following equation:

$$P = KV^2 f$$

where: K is a function of dielectric thickness, dielectric constant, and width of air gap, in accordance with the teachings set forth in other sections of this specification.

P is the power in watts of the corona discharge;
V is the peak voltage (in volts) applied across the electrodes 252 and 254; and
f is the frequency in Hz.

Typically, the frequency according to this aspect of the present invention is in the range of about 100 Hz to 6,000 Hz and the voltage is in the range of about 2,000 to 15,000 volts peak.

THE ELECTRICAL CIRCUITS

Figure 11:
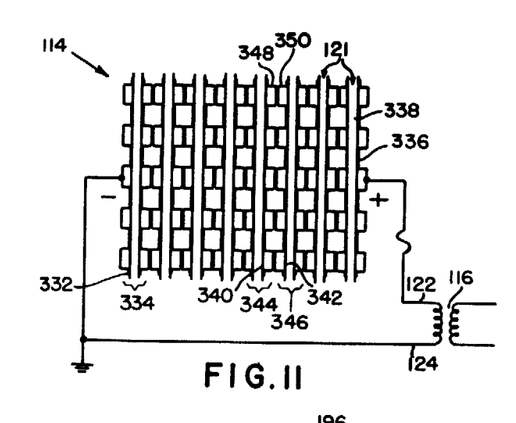
FIG. 11 is an electrical schematic circuit diagram showing the individual corona reactor cells of a corona reactor core connected in series according to the present invention.
Figure 12:
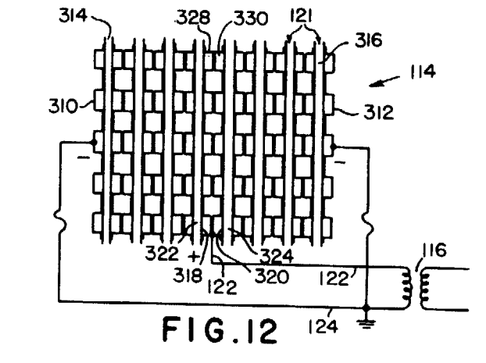
FIG. 12 is an electrical schematic circuit diagram showing the corona reactor cells connected in combination series-parallel.
Figure 13:
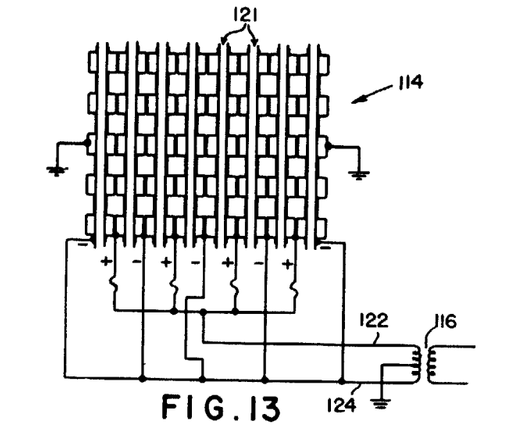
FIG. 13 is an electrical schematic circuit diagram showing the individual corona reactor cells connected in parallel.

Reference will now be made to FIGS. 11–13 for a description of three different voltage driving arrangements of the present invention.

FIG. 11 shows the series connected voltage driving scheme of the present invention which alleviates the above-described disadvantage in the prior art parallel scheme. As shown in FIG. 11, the transformer 116 has one lead connected to a left-hand outside heat sink spacer 332 of the left-hand outside or end cell 334 and the other electrical lead from the transformer 116 is connected to an outside heat sink spacer 336 of the right-hand outside or end cell 338, at the opposite end of the corona reactor core 114. Adjacent plates, (for example plates 340 and 342 of different but adjacent corona reactor cells 344 and 346) are all electrically connected together by virtue of a pair of aluminum heat sink spacers 348 and 350, connected thereto.

In this embodiment, the high voltage applied from the transformer 116 across the entire corona reactor core 114 will preferably be of the order of 30,000–60,000 volts depending upon the use to which the corona reactor 110 is put.

It is found that the individual electrodes of the individual cells 121 act as voltage dividers with the voltage division being governed by the same laws as govern the corona discharge. It has actually been demonstrated that, in a stacked (sandwich) array making up a corona reactor core 114, the corona electrode gap of some (or even one) reactor chambers can be twice the distance of that of the remaining reactor chambers, and yet the corona discharge or intensity will be absolutely uniform throughout every reaction chamber. One reaction chamber was even made wedge-shaped in cross-section with virtually no gap on one edge and a full gap on the opposite edge and a preferably uniform corona was found to exist therein, with the series electrical mode of FIG. 11 of the present invention.

It is further noted that as the exciting voltage is increased from 0 volts up to the corona discharge start (voltage) point, all reaction chambers start at exactly the same voltage. This is not true with the conventional parallel mode electrical circuit, where the reactor chamber with the smallest gap lights first, the second smallest lights second, etc. The uniformity of corona produced by the present invention greatly facilitates the ease and economy of manufacture.

FIG. 12 shows a combination series and parallel electrical connection wherein a smaller voltage can be employed than is used in the embodiment in FIG. 11 where the voltage is supplied across the entire stack (sandwich) or array of corona reactor cells 121 of the corona reactor core 114. In FIG. 12, one electrical lead 124 from the transformer 116 is connected to the two outside end heat sink spacers 310 and 312 (or the adjacent electrode thereof) of the two outside corona reactor cells 314 and 316, respectively. The other electrical lead 122 from the transformer 116 is applied to the two adjacent electrodes 318 and 320 of the two middle corona reactor cells 322 and 324, respectively, by connecting the lead line 122 from the transformer 116 to the spacers 328 and 330 connected to the electrodes 318 and 320 respectively. The operation of this embodiment of the present invention has characteristics of both the parallel and the series electrical circuits discussed above. The voltage to be applied to a corona reactor unit 114 having eight corona reactor cells, as shown in FIG. 12, will be approximately 20,000 to 50,000 volts peak.

FIG. 13 shows a completely parallel electrical arrangement in which a plurality of corona reactor cells 121 are connected in parallel. As stated above, the heat sink spacers 278 and 280 provide electrical connection between adjacent electrodes of adjacent cells. As shown in FIG. 13, the adjacent electrodes of adjacent cells have the same polarity and are electrically connected together. Electrical connection from the transformer 116 is made directly to the heat sink spacers 278 and 280. This parallel system is the preferred electrical arrangement.

EXAMPLE

The preferred parameters for a typical run using the corona reactor 14 of the present invention to generate ozone are as follows:

The reactant was dry oxygen.

The pressure in the individual corona reaction chamber was about 10 psig.

The power applied was 600 watts.

The flow rate was 1.5 CFM.

The number of corona reactor cells in the corona reactor core was 2.

The corona electrode gap (electrode spacing) was 60 mils.

The voltage was 6000 volts peak for each cell.

The ozone yield was 5 pounds per day.

The power frequency was 60 Hz.

The corona frequency was 2000 Hz.

The invention has been described in detail with particular reference to the preferred embodiments thereof, but it will be understood that variations and modifications can be effected within the spirit and scope of the invention as described hereinabove and as defined in the appended claims.

I claim:

1. The method of applying higher frequency current from a lower frequency AC power source to a corona generator comprising at least one corona generating cell including a pair of spaced-apart electrodes and a layer of dielectric material therebetween, said method comprising connecting a frequency converter including a rectifier circuit, an SCR, a firing circuit and a transformer between said corona generator and said lower frequency AC power source, rectifying, the AC from said lower frequency power supply, and chopping the rectified current, at a frequency higher than the lower frequency of the current from said lower frequency AC power supply, with said SCR, said chopping including firing said SCR with said firing circuit, and automatically shutting off said SCR through said connection between said transformer and said corona generator.

2. The method according to claim 1 including increasing the voltage of the current applied to said corona generator by connecting said SCR to said corona generator through a step-up transformer.

3. In the method of applying higher frequency current to a corona generator from a solid state frequency converter circuit employing an SCR, said corona generator comprising at least one corona generating cell including a pair of spaced-apart electrodes and a layer of dielectric material therebetween, the improvement comprising:

shutting off said SCR without the use of a standard shut-off circuit by connecting said corona generator to said SCR through a transformer.

* * * * *